3,086,910
CENTRAL NERVOUS SYSTEM DEPRESSANTS 3-(2'-PYRIDYL)-4-QUINAZOLONES
Bola Vithal Shetty, Liborio A. Campanella, and Edwin E. Hays, Rochester, N.Y., assignors to Wallace & Tiernan Inc., a corporation of Delaware
No Drawing. Filed Mar. 9, 1960, Ser. No. 13,692
3 Claims. (Cl. 167—65)

The invention relates to 3 pyridino quinazolone compositions and more particularly it relates to the use of such compositions as regulators of the central nervous system.

We have discovered that 2-methyl-3-(2'pyridyl)-4-quinazolone and related 3(2'pyridyl)4-quinazolones, as described below; their pharmaceutically acceptable acid addition salts and their resinates are particularly useful as hypnotics. They also are useful as muscle relaxants and anti-spasmodics. These compounds may be administered alone or with excipients and carriers, in dosage amounts ranging from about 40–500 mg. per dose to produce the desired hypnotic effect.

Various diluents may be used and it is obvious the percentage of active ingredient (calculated as free base) may vary widely such as from .005 percent of active ingredient to 95 percent by weight and even higher.

The free base of the compounds comprising this invention may be represented by the following general formula:

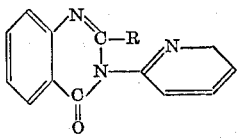

where R is hydrogen or lower alkyl.

Some examples of suitable acid addition salts of the above free bases with inorganic and organic acids are the hydrochloride, hydrobromide, hydroiodate, sulfate, phosphate, maleate, acetate, citrate, succinate, benzoate, glycolate, and others. These can be prepared by methods hereinafter described and well known to the art.

The resinates can be prepared by agitating a suspension of a cation exchange resin such as a sulfonic acid cation exchange resin or a carboxylic acid cation exchange resin preferably in hydrogen form, with the quinazolone base. A product is obtained wherein the cation of the quinazolone compound replaces the hydrogen or other cation of the resin thus forming an adsorption compound or resinate. This adsorption compound when administered is acted upon by the ions in the gastric and intestinal juices and undergoes an ion exchange reaction whereby the pharmaceutically acceptable salt such as the hydrochloride or the free base in solution is formed in the gastric intestinal tract. Where slow release of the quinazoline compound from the resin is desired the sulphonic acid cation exchange resin should be used to form the resinate.

The compounds of this invention are useful for animals as regulators of the central nervous system and as stated above are particularly useful in muscle relaxants and anti-spasmodics.

The utility of a particular drug as a hypnotic, muscle relaxant and anti-spasmodic can be determined by various tests. The following are definitions of various terms used in such tests for evaluating the utility of the drug.

$TD_{50}$ is the neurological deficit, or the median dose of a drug which causes mice to lose their coordination.

EST is the electroshock seizure threshold or the minimal amount of current (A.C.) to cause a convulsion reaction in mice.

MES is the maximal electroshock seizure. The $PD_{50}$ is the dose which will protect 50 percent of mice against the minimal (A.C.) current which will certainly cause convulsions in mice.

Hexobarbital potentiation: Increase in the sleeping time of mice due to a standard dose of hexobarbital.

Strychnine antagonism: The $ED_{50}$ is the dose of a drug which will protect 50 percent of mice from typical strychnine-induced convulsion.

The EST of 2-methyl-3-(2'-pyridl)-4-quinazolone at 126 mg./kg. is 0.469 (0.394–0.558) milliamperes/g.

The MES: $PD_{50}=75.5$ (64–89) mg./kg.

The hexobarbital potentiation of the compound was positive.

The above results as to EST, MES, and hexobarbital potentiation compare favorably with 2-methyl-3-(o-tolyl)4(3H) quinazolone, and indicate that the compounds of this invention are suitable as a hypnotic, muscle relaxants and anti-spasmodics for animals.

The compounds of this invention may be administered alone but are generally administered with a pharmaceutical carrier. For example, they may be administered orally in the form of tablets or capsules containing such excipients as starch, clay, or the like, or in the form of elixir or oral suspension. This is true of the resinates as well as the free base and common salts. However, for parenteral and intromuscular administration the free base and common salts should be used.

The veterinarian will determine the dosage which will be most suitable for a particular application; however, it has been found that doses between 40 and 500 mg. are effective for producing the therapeutical result set forth above. These amounts are calculated on the basis of the free base.

The following examples are illustrative of the method of preparing the compositions of this invention:

EXAMPLE I

*2-Methyl-3-(2'-Pyridyl)-4-Quinazolone*

A mixture of 30.0 gm. (0.32 mole) of 2-amino pyridine, 45.0 gm. (0.25 mole) of acetamido benzoic acid and 400 ml. of toluene was placed in 1-liter, three-necked round-bottomed flask equipped with a stirrer, a dropping funnel and a condenser protected from atmospheric moisture. With vigorous stirring, 11.5 gm. (0.08 mole) of phosphorous trichloride in 50 ml. of toluene was added dropwise during three hours. It was cooled and neutralized with 10 percent sodium carbonate solution. The toluene layer was separated and the aqueous layer was extracted with 100 ml. of toluene. The combined extracts were subjected to steam distillation. The resulting residual oil solidified on standing in a refrigerator for several days. It was recrystallized from absolute methanol. M.P. 164–165° C. Wt.=10.0 gm.

*Analysis.*—Calculated for $C_{14}H_{11}N_3O$: Calculated: C, 70.89; H, 4.64; N, 17.72. Found: C, 70.61; H, 4.64; N, 17.46.

EXAMPLE II

*2-Methyl-3-(2'-Pyridyl)-4-Quinazolone-Hydrochloride*

The compound of Example 1 was reacted with hydrochloric acid to form a hydrochloric salt. This was obtained in solid form by removal of the water by means of vacuum distillation and then purified by crystallization from absolute methanol.

EXAMPLE III

*2-Methyl-3-(2'-Pyridyl)-4-Quinazolone Ionically Bound To a Sulphonic Cation Exchange Resin*

To 370 gms. of moist Amberlite IR 120 resin (225 gms. of dry resin) suspended in distilled water was added an amount of 2-methyl-3-(2'-pyridyl)-4-quinazolone sufficient to yield a product containing approximately 40 percent 2-methyl-3-(2'-pyridyl)-4-quinazolone. The mixture was stirred for two hours, filtered, and dried for fifteen hours at 60° C. The drug-resin complex was found to contain 41 percent 2-methyl-3-(2'-pyridyl)-4-quinazolone.

Following the same procedure, the other compounds disclosed herein can be adsorbed upon and ionically bound with sulphonic acid cation exchange resins or other cation exchange resins, to produce the compositions of the present invention. Such drug-resin complexes may be administered as prepared, or mixed with the usually acceptable excipients. Aqueous suspensions of the resin adsorption compositions can be made and are particularly adapted to be mixed with syrups, such as those made with glucose sucrose, or glycerin, and thus administered in liquid form.

While certain embodiments of the invention have been described, many modifications thereof may be made without departing from the spirit of the invention; and it is not wished to be limited to the detailed examples, formulas, and proportions of ingredients herein set forth. It is desired to be limited only as required by the appended claims.

It is claimed:

1. The method of treating a patient who suffers from increased nervous tension to an excessive or abnormal degree to relieve such tension which comprises administering to the patient a therapeutically effective amount of a compound selected from the group consisting of compounds of the general formula:

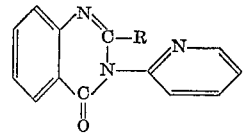

where R is selected from the group consisting of hydrogen and lower alkyls; and their pharmaceutically acceptable acid addition salts.

2. The method of claim 1, wherein the compound is present in dosage unit form and in an amount of from approximately 40–500 milligrams on the basis of free base.

3. The method of treating a patient under muscular tension to relieve said muscular tension which comprises orally administering to the patient a muscle relaxing amount of a salt of 2-methyl-3-(2'pyridyl)-4-quinazolone.

References Cited in the file of this patent

Williams: Detoxication Mechanisms, Wiley, 1947, p. 194.
Baker et al.: C.A. 46, 1952, 10160(d).
Gujral et al.: C.A. 51, 1957, 15787(h).